United States Patent
Mauer et al.

(10) Patent No.: US 8,005,177 B1
(45) Date of Patent: Aug. 23, 2011

(54) PEAK WINDOWING FOR CREST FACTOR REDUCTION

(75) Inventors: Volker Mauer, Buckinghamshire (GB); Kulwinder Dhanoa, London (GB); Paul Metzgen, London (GB)

(73) Assignee: Altera Corporation, San Jose, CA (US)

( * ) Notice: Subject to any disclaimer, the term of this patent is extended or adjusted under 35 U.S.C. 154(b) by 21 days.

(21) Appl. No.: 12/539,409

(22) Filed: Aug. 11, 2009

Related U.S. Application Data

(62) Division of application No. 11/109,536, filed on Apr. 18, 2005, now Pat. No. 7,586,995.

(51) Int. Cl.
*H04B 1/10* (2006.01)
(52) U.S. Cl. .......................... 375/350; 375/346; 375/316
(58) Field of Classification Search .................. 375/350, 375/346, 316
See application file for complete search history.

(56) References Cited

U.S. PATENT DOCUMENTS

| 5,548,540 | A * | 8/1996 | Staver et al. ............... 708/313 |
| 6,504,862 | B1 | 1/2003 | Yang |
| 7,586,995 | B1 | 9/2009 | Mauer et al. |
| 2002/0067771 | A1 * | 6/2002 | Sander ......................... 375/247 |
| 2003/0179829 | A1 | 9/2003 | Pinckley et al. |
| 2004/0005014 | A1 | 1/2004 | Talwar et al. |
| 2004/0203430 | A1 | 10/2004 | Morris |

OTHER PUBLICATIONS

Vaananen, Olli et al., "Effect of Clipping in Wideband CDMA System and Simple Algorithm for Peak Windowing"; *2002 International Conference on Third Generation Wireless and Beyond*, 7 pages.

* cited by examiner

*Primary Examiner* — Dac V Ha
*Assistant Examiner* — Zewdu Kassa
(74) *Attorney, Agent, or Firm* — Ropes & Gray LLP

(57) ABSTRACT

In order to reduce the crest factor of a signal for power amplification, a windowing function is applied. The windowing function that is applied is a triangular windowing function. The use of this function produces good results when those results are measured in terms of their effect on a transmitted signal in a WCDMA communications system. The filter for performing the triangular windowing function receives the signal, and applies it to a first delay element. The output from the first delay element is applied to a second delay element. An adder forms a weighted sum of the received signal and the signals at the outputs of the first delay element and the second delay element. A first accumulator is connected to receive an input from the adder and provides a first accumulator output, while a second accumulator is connected to receive an input from the first accumulator output and provides a second accumulator output.

20 Claims, 5 Drawing Sheets

PEAK WINDOWING FOR CREST FACTOR REDUCTION

CROSS-REFERENCE TO RELATED APPLICATIONS

The present application is a divisional of U.S. patent application Ser. No. 11/109,536, filed Apr. 18, 2005 now U.S. Pat. No. 7,586,995, and entitled "PEAK WINDOWING FOR CREST FACTOR REDUCTION", and is herein fully incorporated by reference for all purposes.

TECHNICAL FIELD

This invention relates to signal processing, and in particular to a method and a device for signal processing, before the signal is applied to a power amplifier.

BACKGROUND

In many communications systems, electronic signals are applied to a power amplifier before transmission. For example, in a base station of a cellular wireless communications system, electronic signals are applied to a power amplifier before being passed to an antenna for transmission over the air interface to the various subscribers.

Power amplifiers are designed such that they operate at maximum efficiency when their input signal levels are within a particular range.

In the case of a Wideband Code Division Multiple Access (WCDMA) or other Code Division Multiple Access (CDMA) system, data streams are multiplied with codes and added together. The composite signal is characterized by large variations in magnitude over time, which results in a large peak-to-average ratio (PAR). This reduces the efficiency of the power amplifiers to which these composite signals are applied before transmission, because the input signal levels are often outside the particular range within which the power amplifiers can operate with maximum efficiency. It is therefore highly desirable to reduce the PAR, without significantly degrading the transmitted signal.

The document "Effect of Clipping in Wideband CDMA System and Simple Algorithm for Peak Windowing", O. Väänänen, J. Vankka and K. Halonen, World Wireless Congress, San Francisco, USA, May 28-31, 2002, pp. 614-619 describes a technique for reducing the PAR of a WCDMA signal. A windowing algorithm is applied to the signal, after upconversion to an intermediate frequency. More specifically, the document proposes the use of a windowing algorithm based on a Hamming function, which is a known mathematical function. The windowing algorithm is therefore known as a Hamming window.

However, the use of a Hamming window function requires the use of relatively large amounts of hardware to implement. This is a particular problem if a long window is used, although the use of a long window is advantageous from the point of view of improving the performance of the algorithm.

The possibility of an efficient implementation of the windowing function is particularly relevant when the device is to be implemented in a Field Programmable Gate Array (FPGA), when hardware resources are typically more limited than in a specifically designed integrated circuit, such as an ASIC.

BRIEF SUMMARY

In an embodiment of the invention, the windowing function that is applied is a triangular windowing function. It has surprisingly been found by the inventors that the use of this function produces good results when applied to a signal that is to be supplied to a power amplifier for amplification. In particular, the use of this function produces good results when those results are measured in terms of their effect on a transmitted signal in a WCDMA communications system.

In another embodiment of the invention, a filter performs a triangular windowing function on a received signal using only registers and adders/subtractors. The filter receives the signal, and applies it to a first delay element. The output from the first delay element is applied to a second delay element. An adder forms a weighted sum of the received signal and the signals at the outputs of the first delay element and the second delay element. A first accumulator is connected to receive an input from the adder and provides a first accumulator output, while a second accumulator is connected to receive an input from the first accumulator output and provides a second accumulator output.

This filter, comprising registers, adders and subtractors, can be implemented particularly efficiently, especially in a FPGA. This means that the filter can be implemented conveniently and at low cost.

DETAILED DESCRIPTION

Figure 1:
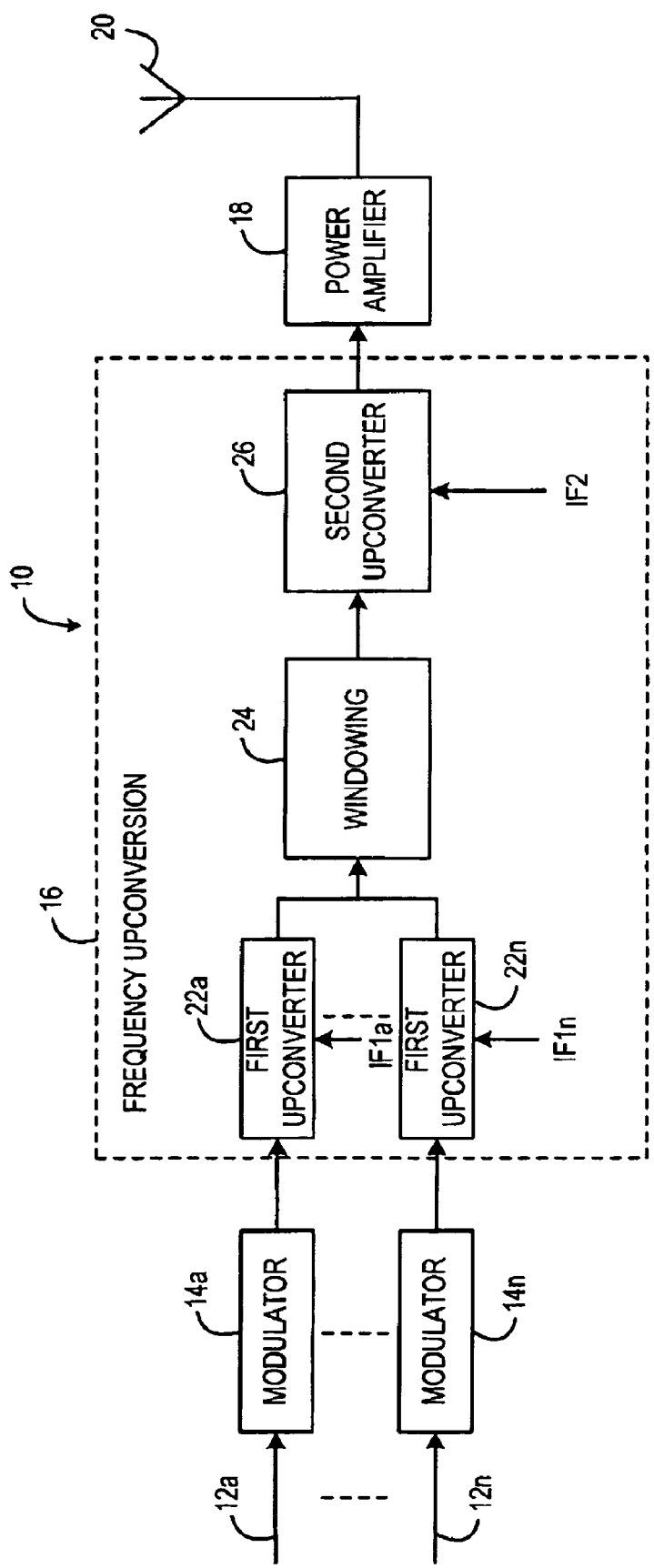
FIG. 1 is a block schematic diagram of a transmitter, for use in a wireless communications system.

FIG. 1 is a block schematic diagram of a transmitter, for use in a wireless communications system. The general form of such a transmitter will be well known to the person skilled in the art, and so the transmitter will be described herein only so far as is necessary for an understanding of the present invention.

In this illustrated embodiment, the transmitter 10 forms part of a base station in a CDMA wireless communications system. As such, the downlink signal, sent from the transmitter 10, is made up of a relatively large number of individual signals combined together. In FIG. 1, the individual data signals are represented by the input lines $12a, \ldots, 12n$. These individual data signals are applied to respective modulators $14a, \ldots, 14n$, where, as will be well known to the person skilled in the art, they are multiplied by respective spreading codes. It will be appreciated that the operation of the modulators $14a, \ldots, 14n$ is complex, but, for the purposes of understanding the present invention, it is sufficient to know that the outputs of the modulator are baseband signals, whose amplitudes vary with time.

The modulator outputs are then applied to a frequency upconversion block 16, which converts the baseband signal to a signal at the desired radio frequency. This radio frequency signal is then applied to a power amplifier 18, for amplification to a desired power level, and is then applied to an antenna 20 for transmission.

Unless special measures are taken, the radio frequency signal applied to the power amplifier 18 has a relatively high peak-to-average ratio (PAR), or crest factor. That is, the peaks in the signal level are considerably higher than the average level of the signal. A disadvantage of the relatively high peak-to-average ratio (PAR) of the signal is that the power amplifier 18 is designed to operate efficiently with input signal levels in a particular range. When the input signal level falls outside that range, the power amplifier 18 can no longer operate efficiently.

In order to mitigate this disadvantage, it is known to take action to reduce the peak levels in the modulator output signal. In this illustrated embodiment of the invention, the action that is taken is to apply a windowing function at an intermediate frequency.

Thus, within the frequency upconversion block 16, the baseband modulator output signals are applied to respective first upconverters 22a, ..., 22n, which also receive signals at respective first intermediate frequencies IF1a, ..., IF1n, and convert the baseband modulator output signals to the first intermediate frequency.

The signals at the first intermediate frequency are then combined, with the composite signal at the first intermediate frequency being applied to a windowing block 24, which applies a windowing function, as will be described in more detail below.

The output of the windowing block 24 is applied to a second upconverter 26, which also receives a signal at a second intermediate frequency IF2, and converts the signal to the desired radio frequency for transmission.

Figure 2:
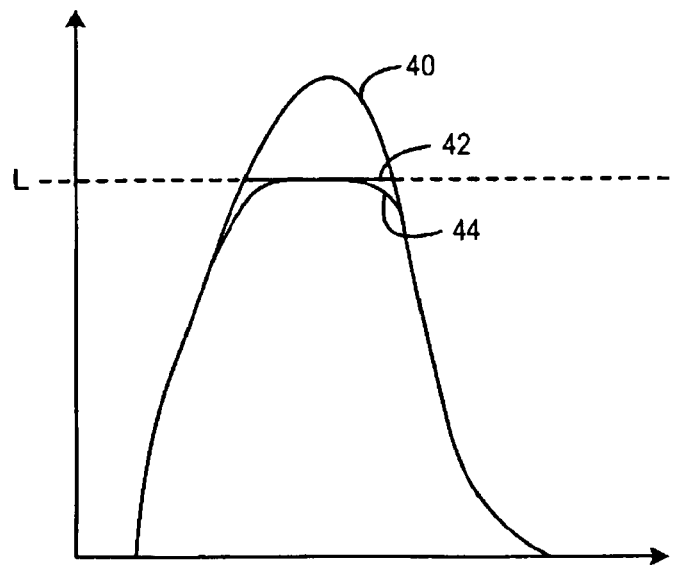
FIG. 2 illustrates the operation of a windowing function on a signal.

FIG. 2 shows schematically the time history of a part of a signal, that is representative of the type of signal that results from the system of FIG. 1.

Specifically, the signal 40 represents the sort of signal that would typically be obtained in a CDMA system, before any windowing function is applied. As can be seen in FIG. 2, the signal 40 reaches a peak value. However, to avoid inefficient operation of the power amplifier 18, it is preferred that the level of the signal should not exceed a level L.

One way to achieve this is to apply a clipping function to the signal 40 to produce a clipped signal 42. That is, the clipped signal 42 is exactly equal to the original signal 40, except that, when the original signal 40 exceeds the level L, the clipped signal 42 is restricted to the level 42. This has the disadvantage that the clipping adds sharp corners to the clipped signal 42, at the points where the clipping begins and ends. These sharp corners will result in frequency leakage into adjacent frequency bands.

In accordance with the preferred embodiment of the present invention, therefore, a windowing function is applied to the original signal 40. FIG. 2 shows the form of the windowed signal 44, and it can be seen that this avoids introducing the sharp corners into the signal.

Clipping can be described mathematically by the following equation:

$$y(n) = c(n) \cdot x(n)$$

in which $x(n)$ is the original signal, $y(n)$ is the clipped output signal, and $c(n)$ is a clipping function, and where the clipping function is given by:

$$c(n) = \begin{cases} 1, & \text{if } |x(n)| \leq A \\ \frac{A}{|x(n)|}, & \text{if } |x(n)| > A \end{cases}.$$

Thus, where the input signal level is less than or equal to a clipping threshold, A, it is unchanged, but, if the input signal level exceeds the clipping threshold, A, it is made equal to that level.

In the case of windowing, the clipping function $c(n)$ is replaced with $b(n)$. Thus:

$$y(n) = b(n) \cdot x(n)$$

in which:

$$b(n) = 1 - \sum_{k=-\infty}^{\infty} a_k w(n-k)$$

where $w(n)$ is a window function, and $a_k$ is a weighting coefficient. Thus, the value of each value of the output $y(n)$ depends not only on the current value of the input $x(n)$, but also on other values within a particular window, provided that the associated weighting coefficient $a_k$ has a non-zero value.

For most values, that is, except where the input signal level $x(n)$ is close to the clipping threshold, A, $b(n)$ should be as close as possible to $c(n)$ to minimize unnecessary clipping. At the same time, $b(n)$ must not exceed $c(n)$, so that the range of the output signal $y(n)$ is guaranteed not to exceed the clipping threshold.

This can be achieved by setting values of the weighting coefficient $a_k$ using the value of the clipping function $c(n)$, and more specifically the term $[1-c(n)]$ such that, when $c(n)$ reaches a steady state value of 1, $b(n)$ also has a steady state value of 1, and the windowing function has no effect on the input signal level.

The value of $b(n)$ is therefore set by convolving the term $[1-c(n)]$ with the window function, as:

$$b(n) = 1 - \sum_{k=-\infty}^{\infty} [1 - c(k)] \cdot w(n-k).$$

This would work well if the distance between samples to be clipped exceeded the window length. Since this can not be guaranteed, and the number of taps must be fixed in order to allow the system to be implemented using FIR filters, the document "Effect of Clipping in Wideband CDMA System and Simple Algorithm for Peak Windowing", O. Väänänen, J. Vankka and K. Halonen, World Wireless Congress, San Francisco, USA, May 28-31, 2002, pp. 614-619 cited above proposes a structure containing a FIR filter with feedback.

Figure 3:
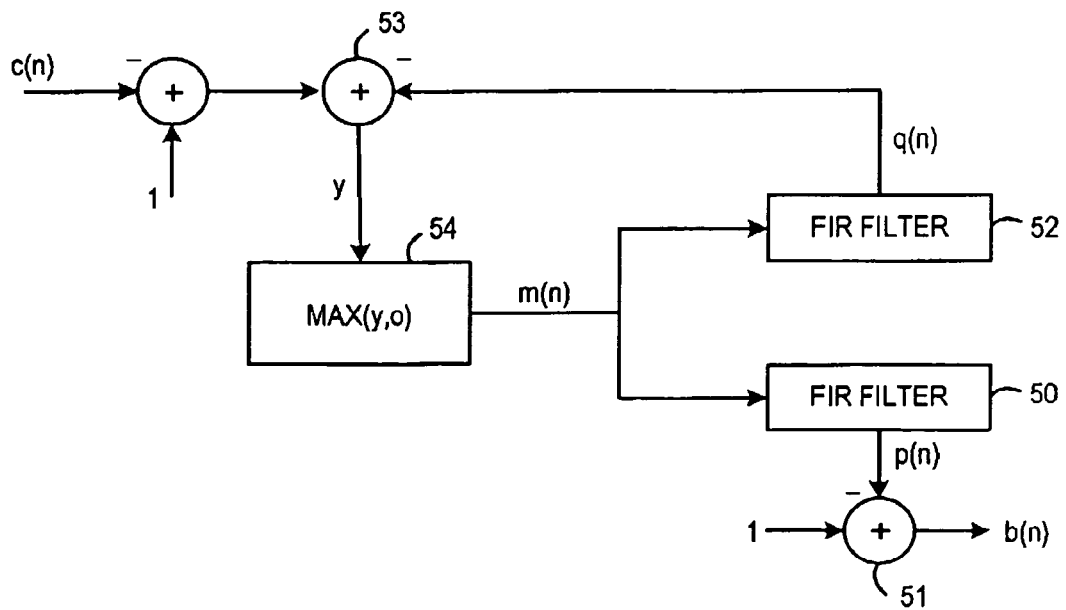
FIG. 3 is a schematic representation of the windowing function.

FIG. 3 is a schematic representation of the windowing function.

A first FIR filter 50 has an impulse response that defines the window function, and it receives an intermediate signal $m(n)$ as its input. An output from the first FIR filter 50 is subtracted from 1 in a first adder 51 to form the output $b(n)$. The intermediate signal $m(n)$ is also applied to a second FIR filter 52, and the output of the second FIR filter 52 is fed back to a second adder 53, where it is subtracted from $(1-c(n))$ to form a second intermediate signal y. A logic block 54 then causes the first intermediate signal $m(n)$ to take the value of y, if and only if y is greater than 0. Otherwise, m(n) takes the value 0, and, in the steady state, there is no windowing and b(n)=1.

Thus, the first intermediate signal m(n) is given by:

$$m(n) = \max\left(0, 1 - c(n) - \sum_{i=1}^{\lceil k/2 \rceil} m(n-i) \cdot w(\lceil k/2 \rceil - i)\right),$$

and so the output b(n) is given by:

$$b(n) = 1 - \sum_{i=1}^{k} m(n-i) \cdot w(i-1).$$

The first FIR filter 50 therefore performs the function:

$$p(n) = \sum_{i=1}^{k} m(n-i) \cdot w(i-1),$$

while the second FIR filter 52 performs the function:

$$q(n) = \sum_{i=1}^{\lceil k/2 \rceil} m(n-i) \cdot w(\lceil k/2 \rceil - i).$$

Thus, as mentioned above, the first FIR filter 50 has an impulse response that defines the window function, and it can also be seen that the second FIR filter 52 in this embodiment has a shape which is half of the shape of that window function.

It has now surprisingly been found that good results can be obtained by the use of a regular triangular window function for the first FIR filter 50. That is, the value of the window function increases in equal-sized steps from zero to a maximum value, and then symmetrically decreases in equal-sized steps to zero.

The optimum length of the window will depend on the nature of the received data stream. In general, the length of the window will be set on the basis of a compromise between achieving a minimum error vector magnitude (EVM), which in general requires a small number of taps, and achieving a low adjacent channel leakage ratio (ACLR), which in general requires a high number of taps.

In an embodiment of the invention, the window length is set to a predetermined value, based on prior knowledge of the expected form of the received data stream. However, in principle the window length can be varied.

Figure 4:
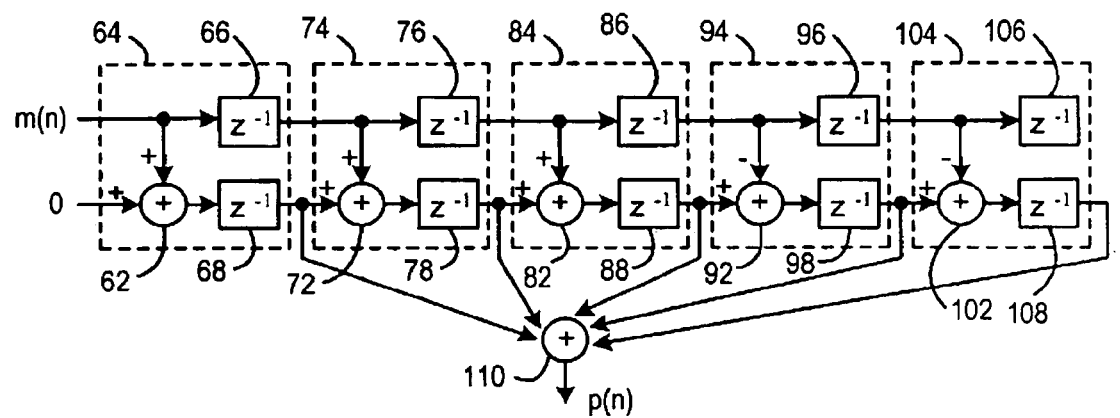
FIG. 4 is a block schematic diagram of a first filter in accordance with the invention, for performing a triangular windowing function.

FIG. 4 is a block schematic diagram, showing the structure of a finite impulse response (FIR) filter 60 for performing the triangular window function. FIG. 4 shows a filter 60 having 5 stages, which therefore implements a window length of 5. It will be appreciated that, in practice, a significantly longer window length would probably be used, but the filter shown in FIG. 4 is sufficient for an understanding of the principle of operation.

An input signal m(n) is applied to a first input of an adder 62 of a first stage 64. The input signal m(n) is also applied to a first delay block 66 of the first stage 64, while the output of the adder 62, which receives a 0 on its second input, is applied to a second delay block 68 of the first stage 64.

The output of the first delay block 66 of the first stage 64 is applied to a first input of an adder 72 of a second stage 74, while the output of the second delay block 68 of the first stage 64 is applied to a second input of the adder 72. The output of the first delay block 66 of the first stage 64 is also applied to a first delay block 76 of the second stage 74. The output of the adder 72 is applied to a second delay block 78 of the second stage 74.

The output of the first delay block 76 of the second stage 74 is applied to a first input of an adder 82 of a third stage 84, while the output of the second delay block 78 of the second stage 74 is applied to a second input of the adder 82. The output of the first delay block 76 of the second stage 74 is also applied to a first delay block 86 of the third stage 84. The output of the adder 82 is applied to a second delay block 88 of the third stage 84.

The output of the first delay block 86 of the third stage 84 is applied to a first input of an adder 92 of a fourth stage 94, while the output of the second delay block 88 of the third stage 84 is applied to a second input of the adder 92. The output of the first delay block 86 of the third stage 84 is also applied to a first delay block 96 of the fourth stage 94. The output of the adder 92 is applied to a second delay block 98 of the fourth stage 94.

The output of the first delay block 96 of the fourth stage 94 is applied to a first input of an adder 102 of a fifth stage 104, while the output of the second delay block 98 of the fourth stage 94 is applied to a second input of the adder 102. The output of the first delay block 96 of the fourth stage 94 is also applied to a first delay block 106 of the fifth stage 104. The output of the adder 102 is applied to a second delay block 108 of the fifth stage 104.

It will be noted from FIG. 4 that the values applied to the first inputs of the adders 62, 72, 82, that is, up to and including the middle one of the five stages, are added to the values applied to the respective second inputs. However, the values applied to the first inputs of the adders 92, 102, that is, after the middle one of the five stages, are subtracted from the values applied to the respective second inputs. This results in the required triangular profile.

The outputs of the respective second delay blocks 68, 78, 88, 98, 108 of the five stages are then summed in an adder 110 to form an output signal p(n).

The form of the filter 60 shown in FIG. 4 is generally conventional, and is particularly suitable for implementation in an Application Specific Integrated Circuit (ASIC). However, in some circumstances, for example where a particularly long window is to be used, or where the device is to be implemented in a Field Programmable Gate Array (FPGA), a more efficient implementation of the triangular windowing function may be advantageous. For example, in FIG. 4, the adder 72 receives two identical inputs, and so its output is equal to twice one of those inputs. The adder 72 could therefore be replaced by a 1 bit left shift operation. In practice, other similar substitutions can be performed.

Figure 5:
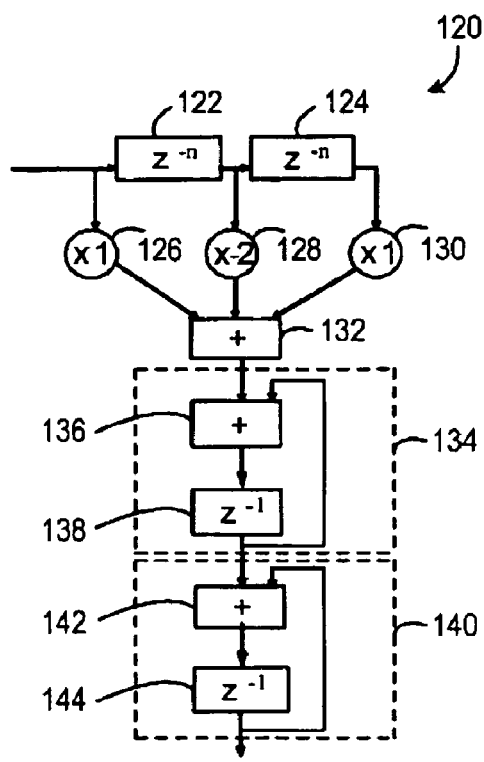
FIG. 5 is a block schematic diagram of a second filter in accordance with the invention, for performing a triangular windowing function.

FIG. 5 is a block schematic diagram of a filter 120 for performing the triangular window function in a particularly efficient way. An input signal is applied to first long delay block 122. The long delay block 122 delays the input signal by n clock cycles before outputting it. The output from the first long delay block 122 is applied to a second long delay block 124, which delays the input signal by a further n clock cycles before outputting it. The long delay blocks 122, 124 can conveniently be implemented, for example, in the memory blocks within a programmable logic device (PLD).

The input signal is also applied to a first multiplier 126, which, in this case, trivially multiplies the input signal by 1. The output signal of the first long delay block 122 is also applied to a second multiplier 128, which, in this case, multiplies the input signal by −2, it being appreciated that this can be achieved by shifting the binary value one place to the left and changing the sign of the binary value. The output signal of the second long delay block 124 is also applied to a third multiplier 130, which, in this case, trivially multiplies its input signal by 1.

The output signals from the multipliers 126, 128, 130 are applied to an adder 132. It will be apparent that, where the multipliers 126, 130 replace their respective inputs by 1, they can be removed, such that the adder 132 adds the input to the first long delay block 122 and the output from the second long delay block 124 and subtracts twice the output of the first long delay block 122.

The output of the adder 132 is applied to a first accumulator 134, which is made up of an adder 136, connected to a block 138 that delays its input signal by one clock cycle, and feeds the result back to the adder 136. The result is that the output of the accumulator 134 becomes equal to its previous output value, plus its current input value.

The output of the accumulator 134 is applied to a second accumulator 140, which is made up of an adder 142, connected to a block 144 that delays its input signal by one clock cycle, and feeds the result back to the adder 142. The result is that the output of the second accumulator 140 becomes equal to its previous output value, plus its current input value.

Figure 6:
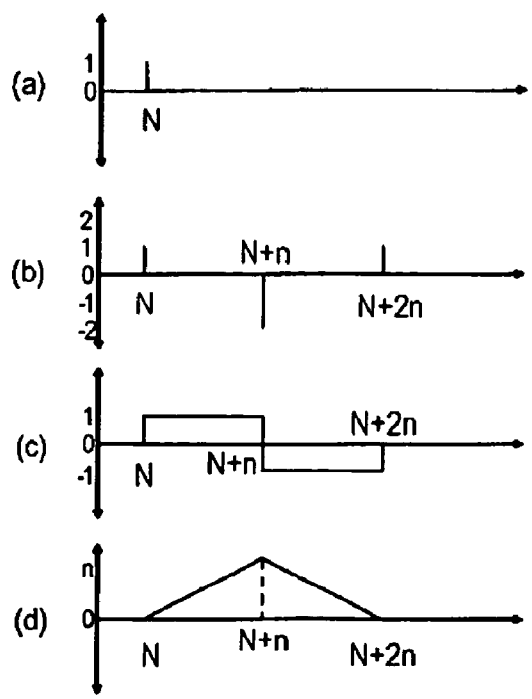
FIG. 6 illustrates the operation of the filter of FIG. 5.

FIG. 6 explains the operation of the circuit shown in FIG. 5. FIG. 6(a) shows an input signal, FIG. 6(b) shows the value of inputs to the accumulator 134, FIG. 6(c) shows the value output from the first accumulator 134 and input to the second accumulator 136, and FIG. 6(d) shows the value output from the second accumulator 136.

To illustrate the operation, it is assumed that an impulse of magnitude 1 is applied to the input of the circuit 120, as shown in FIG. 6. As described above, this input value is applied to the adder 132, which is receiving no other non-zero inputs, and so FIG. 6(b) shows the value 1 at the input to the accumulator 134.

The effect of the accumulator 134, as described above, is that the value output from the first accumulator 134 remains at 1, as shown in FIG. 6(c), for so long as the first accumulator 134 does not receive any further non-zero input.

This constant value is then input to the second accumulator 140 and, as described above, the output value of this accumulator is equal to its previous output value, plus its current input value. Thus, as shown in FIG. 6(d) the output value of the second accumulator 140 increments by 1 in each clock cycle continuously, for so long as the first accumulator 134 outputs the value 1.

After a delay of n clock cycles, the initial input is output by the first long delay block 122 and applied to the second multiplier 128, which multiplies the input signal by −2. The value −2 is therefore applied to the adder 132, which is receiving no other non-zero inputs, and so FIG. 6(b) shows the value −2 at the input to the accumulator 134 in the nth clock cycle after the initial input.

The effect of the accumulator 134, as described above, is then that, in the nth clock cycle after the initial input, the value output from the first accumulator 134 becomes equal to its previous output value (that is, 1) plus its current input value (that is, −2), that is, −1, and it remains at −1, as shown in FIG. 6(c), for so long as the first accumulator 134 does not receive any further non-zero input.

This constant value is then input to the second accumulator 140 and, as described above, the output value of this accumulator is equal to its previous output value, plus its current input value. Thus, as shown in FIG. 6(d), the output value of the second accumulator 140 decrements by 1 in each clock cycle continuously, for so long as the first accumulator 134 outputs the value −1.

After a further delay of n clock cycles, the initial input is output by the second long delay block 124 and applied to the third multiplier 130 and then to the adder 132. As this is receiving no other non-zero inputs, FIG. 6(b) shows the value 1 at the input to the accumulator 134 in the 2 nth clock cycle after the initial input.

The effect of the accumulator 134, as described above, is then that, in the 2 nth clock cycle after the initial input, the value output from the first accumulator 134 becomes equal to its previous output value (that is, −1) plus its current input value (that is, 1), that is, zero, and it remains at zero, as shown in FIG. 6(c), for so long as the first accumulator 134 does not receive any further non-zero input.

This constant value is then input to the second accumulator 140 and, as described above, the output value of this accumulator is equal to its previous output value, plus its current input value. Thus, as shown in FIG. 6(d), the output value of the second accumulator 140, having decremented by 1 for as many clock cycles as it had previously incremented by 1, has become equal to zero, and then remains at zero thereafter.

It can therefore be seen that the circuit shown in FIG. 6 produces a regular triangular window, having equal length periods of incrementing and decrementing. However, different form of triangular window can be achieved, if desired, by adjustment of the relative delays introduced by the first and second long delay blocks 122, 124, and by adjustment of the multiplication factors by which the multipliers 126, 128, 130 multiply their respective inputs.

It will be noted that the window length is determined only by the lengths of the delays introduced by the long delay blocks 122, 124, and that the window length can be altered by varying the delays introduced by these long delay blocks, without requiring any additional hardware other than a possible change in width of the adders.

There is therefore described a filter which efficiently implements a triangular window function.

As mentioned above, the FIR filter 50 in FIG. 3 preferably performs a triangular windowing function. In that case, the FIR filter 52 in the feedback loop preferably performs a half triangular windowing function.

Figure 7:
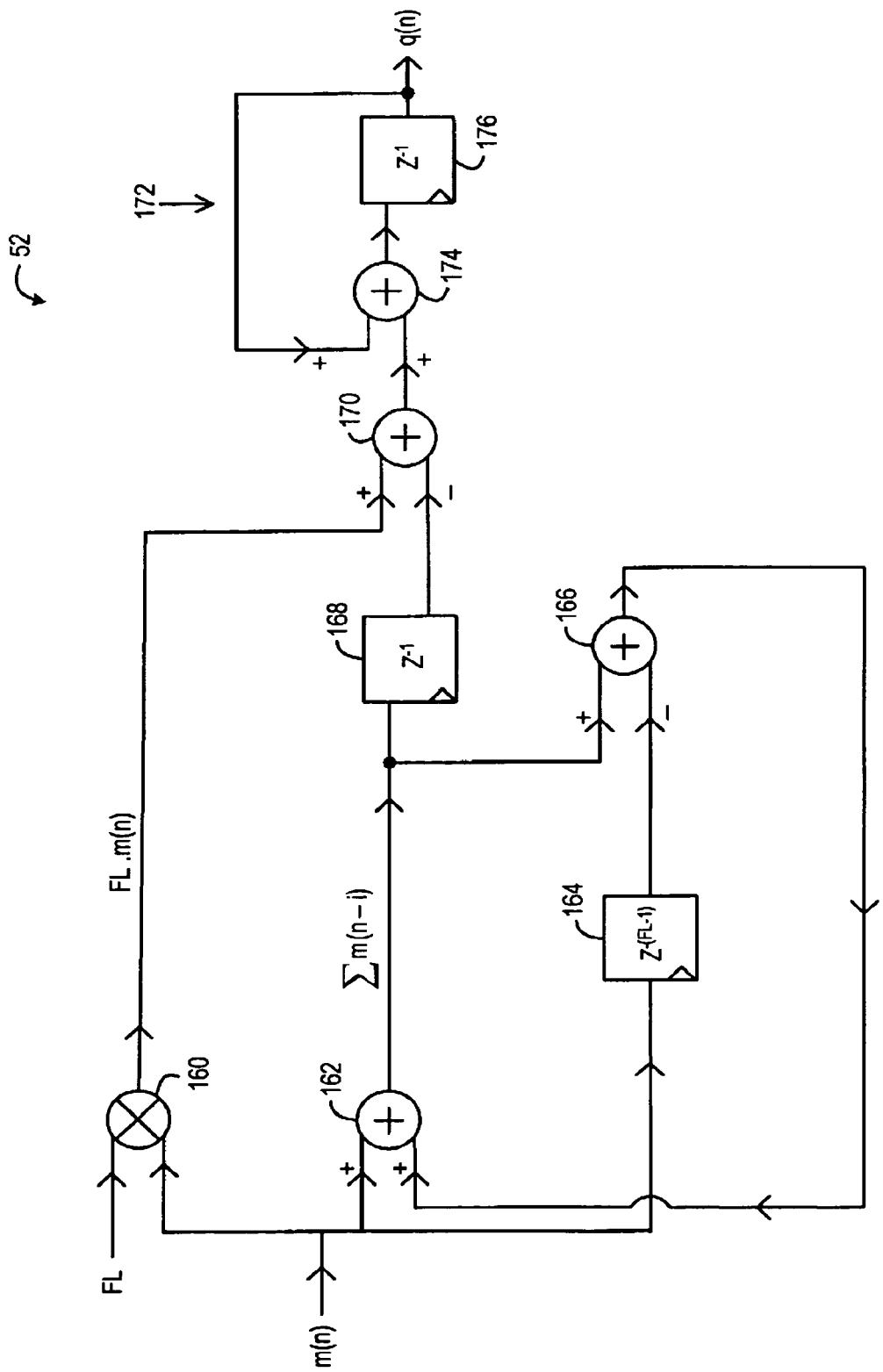
FIG. 7 is a block diagram illustrating the form of a filter in FIG. 3.

FIG. 7 is a block diagram showing the form of the FIR filter 52.

Where the FIR filter 50 has a filter length of N, the half triangular window of the FIR filter 52 has a filter length, FL=(N−1)/2.

Then, the output q(n) of the FIR filter 52 is related to its input m(n) by the relationship:

$$q(n)=FL.m(n)+(FL-1).x(n-1)+\ldots$$

Similarly:

$$q(n+1)=FL.m(n+1)+(FL-1).m(n)+\ldots$$

Therefore:

$$q(n+1)-q(n)=FL.m(n+1)-m(n)-m(n-1-FL+1)-m(n-FL)$$

That is:

$$q(n+1) = q(n) + FL.m(n+1) - \sum_{i=0}^{FL} m(n-i).$$

FIG. 7 is a block diagram showing an implementation of the FIR filter 52. The input m(n) is applied to a multiplier 160, where it is multiplied by the value of FL. Of course, if FL is a power of 2, this multiplication can be replaced by a left shift operation by the appropriate number of bit positions.

The input m(n) is also applied to a first input of a first adder 162, and to a (FL−1) period delay block 164. The output of the delay block 164 is applied to a second adder 166, where it is subtracted from the output of the first adder 162. The output of the second adder 166 is fed back to a second input of the first adder 162.

The output of the first adder 162 is also applied to a delay block 168, and the output of the delay block 168 is applied to a third adder 170. where it is subtracted from the output of the multiplier 160. The resulting signal is applied to an accumulator 172, comprising a fourth adder 174 and a delay block 176 to form the output q(n).

The FIR filter 52 therefore forms the signal q(n) from the input m(n).

Thus, as described above with reference to FIG. 1, the input data stream from the first upconverter 22 is applied to the windowing block 24, which applies the windowing function. That is, based on the current value x(n) of the input, a value for c(n) is calculated, determined by the relationship between x(n) and the clipping threshold A. From that, and based on the triangular window function described above, a value for b(n) is calculated, and hence a value for the output y(n) is calculated.

There is thus described a system which provides good performance in terms of its crest factor reduction, without excessively adversely affecting the other properties of the signal, while being easy to implement.

Although the invention has been described with particular reference to a CDMA wireless communications system, it could equally be applied to other wireless communications systems, such as OFDM systems. Further, although the invention has been described in terms of a wireless communication system, the crest factor of any signal can be reduced, if required, in a corresponding way.

What is claimed is:

1. A filter for performing a triangular windowing function on a received signal, the filter comprising:
   a filter input for the received signal;
   a first delay element having an input coupled with said filter input and having an output;
   a second delay element having an input coupled with the output of said first delay element and having an output;
   a first adder operable to form a weighted sum of the received signal and signals at the outputs of the first delay element and the second delay element;
   a first accumulator operable to receive the weighted sum from the first adder and provide a first accumulator output; and
   a second accumulator operable to receive an input from the first accumulator output and provide a second accumulator output.

2. The filter of claim 1, wherein the first and second delay elements are operable to delay their respective input signals by time delays of more than one clock period.

3. The filter of claim 1, wherein the first and second delay elements are operable to delay their respective input signals by equal time delays.

4. The filter of claim 1, wherein the first and second delay elements are operable to delay their respective input signals by equal time delays of more than one clock period.

5. The filter of claim 1, wherein the adder is operable to form the weighted sum by adding:
   the received signal multiplied by a first multiplier;
   the output of the first delay element multiplied by a second multiplier; and
   the output of the second delay element multiplied by a third multiplier.

6. The filter of claim 1, further comprising a multiplier, the multiplier operable to:
   receive the output of the first delay element;
   multiply the output of the first delay element by minus two; and
   supply an input to the first adder, such that the first adder forms the sum of (a) the received signal, (b) twice the inverse of the signal at the output of the first delay element, and (c) the signal at the output of the second delay element.

7. The filter of claim 1, wherein the first accumulator includes:
   a second adder having a first input coupled with an output of the first adder and having an output; and
   a third delay element having an input coupled with the output of the second adder and having an output coupled with a second input of the second adder, wherein the third delay element is operable to provide a delay of one clock cycle.

8. The filter of claim 7, wherein the second accumulator includes:
   a third adder having a first input coupled with an output of the first accumulator and having an output; and
   a fourth delay element having an input coupled with the output of the third adder and having an output coupled with a second input of the third adder, wherein the fourth delay element is operable to provide a delay of one clock cycle.

9. The filter of claim 1, wherein the filter is implemented in a programmable logic device, and wherein the first and second delay elements are implemented in memory blocks within the programmable logic device.

10. A method for performing a triangular windowing function on a received signal, the method comprising:
   receiving a signal at a filter input;
   delaying the received signal to provide a first delayed signal;
   delaying the first delayed signal to provide a second delayed signal;
   forming a weighted sum of the received signal, the first delayed signal, and the second delayed signal;
   accumulating the weighted sum to provide an accumulated weighted sum; and
   accumulating the accumulated weighted sum to provide an output of a triangular windowing function on the received signal.

11. The method of claim 10, wherein received signal and the first delayed signal are delayed by equal time delays of more than one clock period.

12. The method of claim 10, wherein forming the weighted sum includes adding:
   the received signal multiplied by a first multiplier;
   the first delayed signal multiplied by a second multiplier; and the second delayed signal multiplied by a third multiplier.

13. The method of claim 10, further comprising:
prior to forming the weighted sum, multiplying the first delayed signal by minus two such that the weighted sum is the sum of: (a) the received signal, (b) twice the inverse of the signal at the output of the first delay element, and (c) the signal at the output of the second delay element.

14. The method of claim 10, wherein accumulating the weighted sum to provide an accumulated weighted sum includes:
adding a current weighted sum to a previous accumulated weighted sum.

15. The method of claim 14, wherein accumulating the accumulated weighted sum includes:
adding a current accumulated weighted sum to the previous value of the output.

16. A filter for performing a half-triangular windowing function on a received signal, the filter comprising:
a multiplier operable to receive an input signal and operable to output the input signal multiplied by a filter, wherein the filter is of length FL;
a first adder operable to receive the input signal at a first input and provide a first output;
a first delay block operable to delay the input signal and provide the delayed input signal at an output;
a second adder operable to subtract the delayed input signal from the first output of the first adder and provide a second output, wherein a second input of the first adder is operable to receive the second output;
a second delay block operable to receive the first output and provide a second delayed signal;
a third adder operable to subtract the delayed signal from the output of the multiplier and provide a third output; and
an accumulator operable to receive and accumulate the third output.

17. The filter of claim 16, wherein the accumulator includes:
a fourth adder operable to receive the third output from the third adder at a first input and provide a fourth output; and
a third delay block operable to delay the fourth output and output a third delayed signal, wherein the fourth adder is further operable to receive the third delayed signal at a second input.

18. The filter of claim 17, wherein the third delay block is operable to delay the fourth output for one clock cycle.

19. The filter of claim 16, wherein the first delay block is operable to delay the input signal for FL−1 clock cycles.

20. The filter of claim 16, wherein the second delay block is operable to delay the first output for one clock cycle.

* * * * *